United States Patent
Nogami

(10) Patent No.: US 9,697,394 B2
(45) Date of Patent: Jul. 4, 2017

(54) RFID TAG SYSTEM AND RFID READER/WRITER

(71) Applicant: OMRON CORPORATION, Kyoto (JP)

(72) Inventor: Hidekatsu Nogami, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 251 days.

(21) Appl. No.: 13/826,200

(22) Filed: Mar. 14, 2013

(65) Prior Publication Data
US 2013/0241702 A1  Sep. 19, 2013

(30) Foreign Application Priority Data
Mar. 15, 2012 (JP) ................................. 2012-058700

(51) Int. Cl.
*G06K 7/10* (2006.01)
*H01Q 1/22* (2006.01)
*H01Q 9/04* (2006.01)

(52) U.S. Cl.
CPC ..... *G06K 7/10316* (2013.01); *G06K 7/10168* (2013.01); *H01Q 1/2216* (2013.01); *H01Q 9/0435* (2013.01)

(58) Field of Classification Search
CPC .......... G06K 7/10316; G06K 7/10168; H01Q 1/2216; H01Q 9/0435; H04J 14/06;
(Continued)

(56) References Cited

U.S. PATENT DOCUMENTS 4,323,898 A * 4/1982 Barnes .................... G01S 7/024
342/188
6,222,503 B1 * 4/2001 Gietema et al. .............. 343/890
(Continued)

FOREIGN PATENT DOCUMENTS

EP     1835435     9/2007
EP     1863125    12/2007
(Continued)

OTHER PUBLICATIONS

U.S. Appl. No. 13/826,287 to Hidekatsu Nogami, which was filed on Mar. 14, 2013.
(Continued)

*Primary Examiner* — Yong Hang Jiang
(74) *Attorney, Agent, or Firm* — Greenblum & Bernstein, P.L.C.

(57) ABSTRACT

An aspect of the present invention provides an RFID tag system in which a null point is hardly generated. The RFID tag system includes an RFID tag and an RFID reader/writer. The RFID reader/writer includes a transmitter that transmits a circularly-polarized radio wave to the RFID tag, a receiver that separately receives horizontal and vertical polarization components of a return wave from the RFID tag; and a received signal combiner that logically combines signals separately received by the receiver. The received signal combiner includes an optimum combiner that combines the horizontal polarization component and the vertical polarization component such that an S/N ratio of the received signal is enhanced compared with the case that the horizontal polarization component and the vertical polarization component are separately received.

3 Claims, 6 Drawing Sheets

(58) Field of Classification Search
CPC ...... H04B 7/10; H04B 10/541; H04B 10/532; H04B 10/60; H04B 10/614; H04B 10/548; H04B 7/0413; H04B 7/08
USPC ....... 340/10.1; 343/725, 729, 893, 751, 824, 343/835, 844, 853, 879
See application file for complete search history.

(56) References Cited

U.S. PATENT DOCUMENTS

| | | | |
|---|---|---|---|
| 6,359,588 | B1 | 3/2002 | Kuntzsch |
| 7,432,855 | B2 | 10/2008 | Mohamadi |
| 7,692,585 | B2 | 4/2010 | Mohamadi |
| 2002/0033766 | A1* | 3/2002 | Pratt ........................ 342/357.06 |
| 2003/0162566 | A1 | 8/2003 | Shapira et al. |
| 2006/0279458 | A1 | 12/2006 | Mohamadi |
| 2007/0222608 | A1* | 9/2007 | Maniwa ............. G06K 7/10316 340/572.7 |
| 2007/0279192 | A1* | 12/2007 | Tanaka ......................... 340/10.2 |
| 2007/0279311 | A1 | 12/2007 | Kai et al. |
| 2009/0027266 | A1 | 1/2009 | Mohamadi |
| 2012/0027052 | A1* | 2/2012 | Botha .................. H04B 1/7113 375/147 |

FOREIGN PATENT DOCUMENTS

| | | |
|---|---|---|
| FR | 600799 | 2/1926 |
| JP | 2005-072884 | 3/2005 |
| JP | 2006-303939 | 11/2006 |
| JP | 2008-199190 | 8/2008 |
| JP | 4581534 | 9/2010 |

OTHER PUBLICATIONS

U.S. Appl. No. 13/826,387 to Hidekatsu Nogami, which was filed on Mar. 14, 2013.
Office Action issued in Japan Counterpart Patent Appl. No. 2012-058700, dated Nov. 10, 2015, along with an English language translation thereof.
Search Report issued by E.P.O. patent office in E.P.O. Patent Application No. 13158729.7, dated Jul. 23, 2014.
Foreign Official Action issued in JP 2012-58700, dated Dec. 1, 2016 and English language translation thereof.

* cited by examiner

RFID TAG SYSTEM AND RFID READER/WRITER

CROSS-REFERENCE TO RELATED APPLICATION

This application claims benefit of priority under 35 U.S.C. §119 to Japanese Application No. P2012-058700 filed on Mar. 15, 2012, which is expressly incorporated herein by reference in its entirety.

TECHNICAL FIELD

The present invention relates to an RFID tag system and an RFID reader/writer, particularly to an RFID tag system and an RFID reader/writer, which can prevent generation of a null point.

RELATED ART

Conventionally, for example, Japanese Patent No. 4581534 discloses a radio receiver that includes plural receiving antenna elements in order to receive a signal transmitted from a predetermined communication target.

In the radio receiver disclosed in Japanese Patent No. 4581534, the receiving antenna element that receives the signal is selectively switched in the plural receiving antenna elements such that the same signal transmitted plural times from the communication target is received by the different receiving antenna elements in synchronization with transmission timing of the signal, receiving information, which is obtained such that the same signal transmitted plural times from the communication target is received by each of the plural receiving antenna elements in synchronization with transmission timing of the signal, is stored while correlated with the transmission timing, and plural kinds of pieces of stored receiving information corresponding to the signals transmitted from the communication target in synchronization with the transmission timings are read and combined.

As a result, the number of receiving circuits can be decreased, and a receiving result equivalent to the case that the signal is simultaneously received by the plural receiving antenna elements is obtained. That is, a radio receiver in which received signal combination processing is performed by a relatively simple configuration to obtain an effect of directionality control can be provided.

The conventional radio receiver in which received signal combination processing is performed by a relatively simple configuration to obtain an effect of directionality control is configured as described above.

However, the conventional radio receiver does not consider how to deal with falling out of reading of the signal from the RFID tag at a point (a null point) where the radio wave reflected by a floor or a wall and a direct wave are combined to generate a reading error.

SUMMARY

The present invention has been devised to solve the problems described above, and an object thereof is to provide an RFID tag system and an RFID reader/writer, in which the null point is not generated.

In accordance with one aspect of the present invention, an RFID tag system includes: an RFID tag; and an RFID reader/writer, wherein the RFID reader/writer includes: a transmission circuit (e.g., a transmitter) that transmits a circularly-polarized radio wave to the RFID tag; a receiving circuit (e.g., a receiver) that separately receives horizontal and vertical polarization components of a return wave from the RFID tag; and a received signal combination part (e.g., a received signal combiner) that logically combines signals separately received by the receiving circuit, and the received signal combination part includes an optimum combination part (e.g., an optimum combiner) that combines the horizontal polarization component and the vertical polarization component such that an S/N ratio (i.e., a signal-to-noise ratio) of the received signal is enhanced compared with the case that the horizontal polarization component and the vertical polarization component are separately received.

Preferably the RFID tag system includes a single antenna, wherein the transmission circuit and the receiving circuit are connected to the single antenna.

The receiving circuits (e.g., a first receiver and a second receiver) that separately receive the horizontal and vertical polarization components of the return wave may separately be provided.

Each of the receiving circuits separately provided for the horizontal and vertical polarization components may include a weighting circuit separately provided.

In accordance with another aspect of the present invention, an RFID reader/writer that conducts communication with an RFID tag, the RFID reader/writer includes: a transmission circuit that transmits a circularly-polarized radio wave to the RFID tag; a receiving circuit that separately receives horizontal and vertical polarization components of a return wave from the RFID tag; and a received signal combination part that logically combines signals separately received by the receiving circuit, wherein the received signal combination part includes an optimum combination part that combines the horizontal polarization component and the vertical polarization component such that an S/N ratio of the received signal is enhanced compared with the case that the horizontal polarization component and the vertical polarization component are separately received.

The horizontal polarization component and the vertical polarization component mean that the polarization planes are deviated from each other by 90 degrees. For example, the configuration of the present invention can deal with the radio wave in which one of the horizontal polarization component and the vertical polarization component has the polarization plane of obliquely right 45 degrees while the other has the polarization plane of obliquely left 45 degrees.

In the present invention, the separately-received signals are logically combined, and the horizontal polarization component and the vertical polarization component are combined such that the S/N ratio of the received signal is enhanced compared with the case that the horizontal polarization component and the vertical polarization component of the received signal are separately received.

As a result, the signal can be received from the RFID tag irrespective of the orientation of the RFID tag, and received signal having the high S/N ratio is obtained. Therefore, the null point is not generated.

DETAILED DESCRIPTION

(1) First Embodiment

Figure 1:
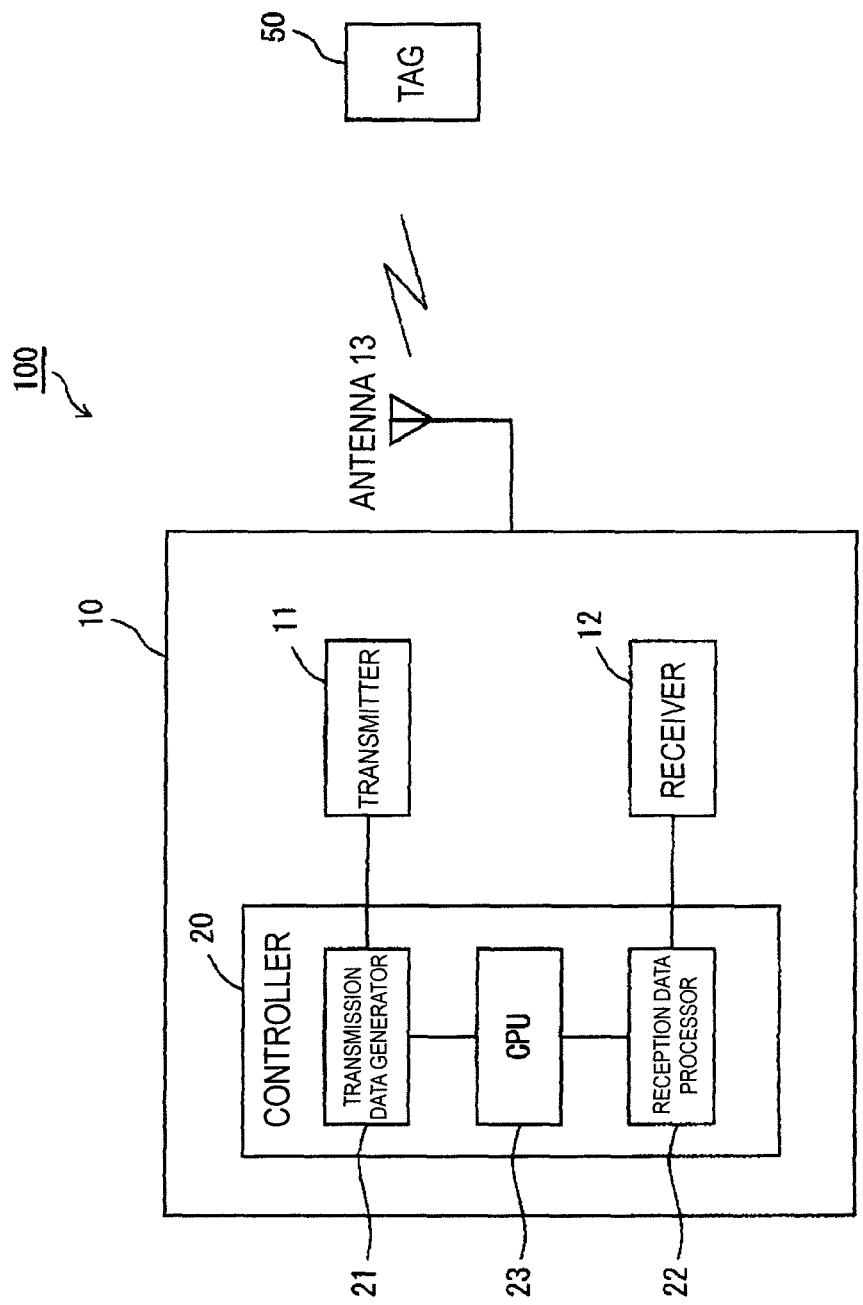
FIG. 1 is a schematic block diagram illustrating an entire configuration of an RFID tag system.

Hereinafter, an embodiment of the present invention will be described with reference to the drawings. FIG. 1 is a schematic block diagram illustrating an entire configuration of an RFID tag system 100 according to an embodiment of the present invention. The RFID tag system 100 includes an RFID reader/writer 10 and an RFID tag 50. The RFID reader/writer 10 includes a controller 20 that controls the whole of the RFID reader/writer 10, a transmitter 11 and a receiver 12, which are connected to the controller 20, and an antenna 13 that is connected to the transmitter 11 and the receiver 12.

The controller 20 includes a CPU 23 that controls the controller 20, a transmission data generator 21 that is controlled by the CPU 23 to generate such predetermined transmission data as a command, and a receiving data processor 22 that processes received data received from the RFID tag 50. The data generated by the transmission data generator 21 is transmitted to the RFID tag 50 through the transmitter 11 and the antenna 13. A signal from the RFID tag 50 is processed by the receiving data processor 22 through the antenna 13 and the receiver 12.

A first embodiment of the present invention will be described below. In the first embodiment, the RFID reader/writer 10 and the RFID tag 50 communicate with each other using slant polarization. As used herein, the slant polarization means that an orientation of a composite wave of a horizontal electric field and a vertical electric field intersects a ground surface or a wall. For example, when being reflected by a floor or the wall, the slant polarization of obliquely right 45 degrees changes to the slant polarization of obliquely left 45 degrees.

At this point, horizontal polarization differs from vertical polarization in a phase when being reflected by the floor. In a metallic surface, because a phase difference between the horizontal polarization and the vertical polarization is about 180° at a reflection point, a reflected wave of the polarization of obliquely right 45 degrees becomes obliquely left 45 degrees.

In a radio wave, which is output from the RFID reader/writer 10 and incident to the floor or the wall in the slant polarization, a polarization direction changes by 90 degrees. Therefore, a direct wave and the reflected wave exist as a cross polarization component at a position of the RFID tag 50. When the cross polarization component exists while the RFID tag is linear polarization, an influence of the reflected wave can be reduced by combining a polarization plane of the RFID tag and a polarization plane of the direct wave.

When both the antennas of the RFID reader/writer and RFID tag are slanted, the reflected wave is not matched with a polarization direction of the antenna of the RFID tag while the direct wave is matched with the polarization direction of the RFID tag, so that the influence of the reflected wave can be largely reduced.

As described in the related art, the generation of the null point can be prevented when the influence of the reflected wave is reduced.

Figure 2:
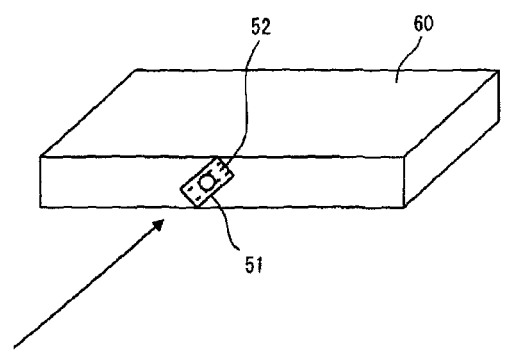
FIG. 2 is a perspective view illustrating a state in which an RFID tag according to a first embodiment is attached to an article.

A specific example in which the RFID tag 50 is obliquely placed on an article will be described below. FIG. 2 is a view illustrating the case that an RFID tag 51 is provided on one end surface of such a rectangular-solid conveyance article (a conveyance medium) 60 as a pallet. The RFID tag 51 is provided on one end surface of the conveyance article 60, and an antenna 52 (indicated by a dotted line in FIG. 2) of the RFID tag 51 is obliquely placed with respect to a rectangular side constituting the end surface of the conveyance article 60. When the RFID tag 51 is attached while slanted with respect to the rectangular side constituting the end surface of the conveyance article 60, inevitably the antenna 52 of the RFID tag 51 is obliquely disposed with respect to a floor surface or a wall surface.

The antenna 52 of the RFID tag 51 is obliquely placed with respect to the floor surface or the wall surface by way of example. At this point, preferably an antenna of the RFID reader/writer is formed into a rod shape and the rod-shaped antenna is obliquely placed with respect to a horizontal surface and a vertical surface. The largest effect is obtained, when the slants of both the antenna 52 of the RFID tag 51 and the antenna of the RFID reader/writer are combined to obliquely place the antenna 52 of the RFID tag 51 and the antenna of the RFID reader/writer with respect to the floor surface or the wall surface.

The antenna of the RFID reader/writer may be a patch antenna or a slot antenna. For the patch antenna, a feeding point may be disposed such that the slant polarization is generated with respect to the floor surface or the wall surface.

Figure 3A:
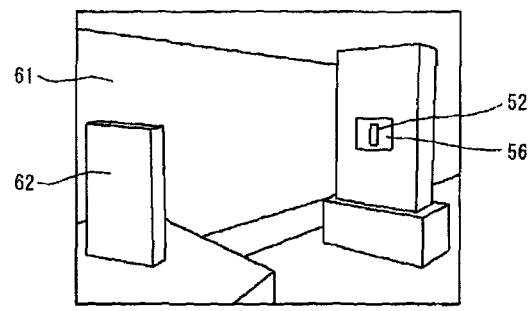
FIGS. 3A and 3B are perspective views illustrating the conventional case and the case that the RFID tag of the first embodiment is attached to the article.
Figure 3B:
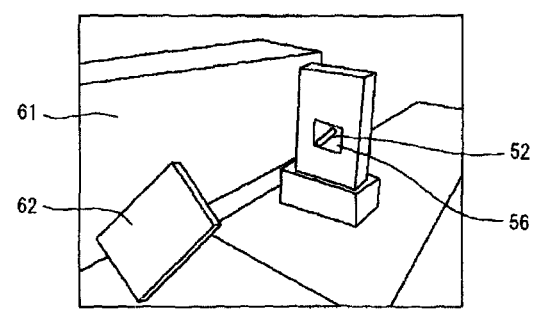
Figure 4:
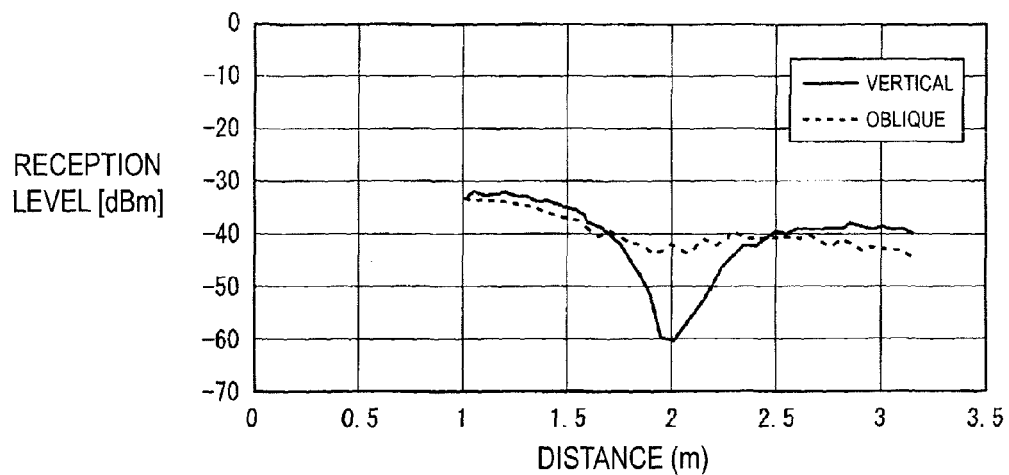
FIG. 4 is a graph illustrating a difference of an effect between the conventional case and the case of the first embodiment.

The effect of this case will be described below. FIGS. 3A and 3B are views illustrating a device used in an experiment to detect a difference of the effect between the conventional configuration (FIG. 3A) and the configuration of the first embodiment (FIG. 3B). A metallic plate 61 was placed in a lateral (a side surface) direction instead of the ground surface, and a variation in receiving level was detected in the case that the antenna 52 of an RFID tag 56 was placed in a direction parallel to the metallic plate 61 (FIG. 3A) and in the case that the antenna 52 was placed in an oblique 45-degree direction (FIG. 3B). FIG. 4 is a graph illustrating an experimental result. At this point, the antenna (not illustrated) of an RFID reader/writer 62 is oriented toward the same direction as the antenna 52 of the RFID tag 56.

In FIG. 4, a vertical axis indicates a receiving level (dB) and a horizontal axis indicates a distance (m) from the RFID reader/writer 62. A solid line indicates received data in the case that the antenna is vertically placed, and a dotted line indicates received data in the case that the antenna is obliquely placed by 45 degrees.

In an experimental environment, the null point is generated at a point of 2 m in the case that the antenna is vertically placed, while the influence can largely be reduced in the case that the antenna is obliquely placed. Accordingly, it is found that a large effect to prevent the falling out of the reading exists in the environment in which the slant polarization is dominantly reflected by the floor.

(2) Second Embodiment

Figure 5A:
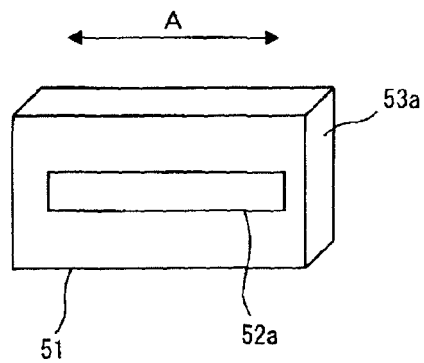
FIGS. 5A and 5B are perspective views illustrating configurations of a conventional RFID tag and an RFID tag according to a second embodiment.

A second embodiment of the present invention will be described below. In the conventional embodiment, as illustrated in FIG. 5A, the RFID tag 51 including a horizontally extending antenna 52*a* is horizontally provided in a rectangular tag case 53*a* including a pair of horizontal side facing each other and a pair of vertical sides facing each other (see FIG. 5A).

On the other hand, in the second embodiment, the antenna of the RFID tag 54 is obliquely disposed by around 45 degrees with respect to a reflecting surface (the floor or the wall). Such a structure as the floor and the wall is horizontal or vertical to the ground surface, and the structure is rarely obliquely disposed. That is, usually the reflection point is horizontal or vertical to the ground surface. Because the RFID tag is placed on the pallet, frequently the RFID tag is used in the horizontal or vertical state.

Accordingly, in the case that the antenna of the RFID tag is obliquely placed with respect to the ground surface or the wall, the slant polarization is obtained when viewed from most reflection points.

Figure 5B:
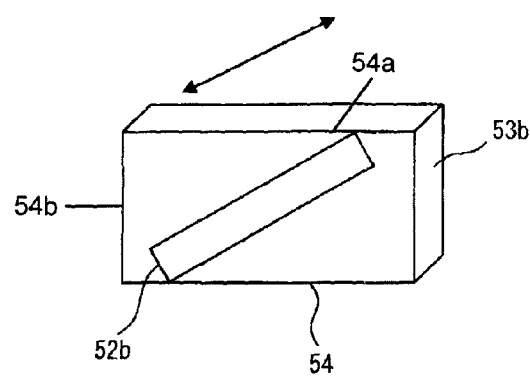

FIG. 5B is a perspective view illustrating the RFID tag of the second embodiment. As illustrated in FIG. 5B, in the second embodiment, the RFID tag 54 includes a long antenna 52*b* provided in a rectangular surface. The antenna 52*b* is accommodated in a tag case 53*b* of the RFID tag 54, and the antenna 52*b* extends in a direction oblique to sides 54*a* and 54*b* constituting the rectangular surface of the tag case 53*b*. The tag case 53*b* may be a molding body including the antenna 52*b*.

Usually, the RFID tag is attached to a tag attachment part provided in the article, and the tag attachment part is provided parallel or vertical to the side of the rectangular surface constituting the article. Accordingly, the polarization plane can be slanted only by attaching the RFID tag to the rectangular tag attachment part.

In the second embodiment, because the antenna 52*b* itself of the RFID tag 54 is obliquely provided, the antenna 52*b* is automatically obliquely placed when a user attaches the RFID tag 54 to the predetermined tag attachment part as usual. Therefore, the user can unintentionally use the slant polarization.

In the second embodiment, the tag case is formed into the rectangular shape by way of example. Alternatively, the tag case may have a polygonal shape including a side that becomes a base when the RFID tag is attached to the article, or an arc shape except the side that becomes the base.

In this case, the same effect as the second embodiment is also obtained.

(3) Third Embodiment

A third embodiment of the present invention will be described below. In the case that the pallet is used while the RFID tag is attached to the pallet, the pallet is placed in not only the horizontal direction but also the vertical direction. When the RFID tag is obliquely attached to the pallet by correct 45 degrees, the RFID tag can deal with both the horizontally-placed pallet and the vertically-placed pallet. However, actually the RFID tag is not always obliquely attached to the pallet by correct 45 degrees. In this case, in the first and second embodiments, a communication failure is generated, and the RFID tag cannot deal with both the horizontally-placed pallet and the vertically-placed pallet only when the slant polarization is used. For example, in the case that the RFID tag is placed at obliquely right 45 degrees while the pallet is horizontally placed, the RFID tag becomes obliquely left 45 degrees when the pallet is placed upright. In the case that the polarization plane of the RFID reader/writer is set to obliquely right 45 degrees according to the horizontally-placed pallet, the RFID reader/writer cannot read the RFID tag because the polarization plane of the RFID reader/writer is not matched with the polarization plane of the RFID tag.

The system of the third embodiment can deal with such a case.

In the communication field, sometimes transmitting and receiving antennas facing each other are operated in the circular polarization in order to reduce an influence of ground surface reflection. However, usually the antenna of the RFID tag is formed into a dipole shape, and operated as the linear polarization antenna. Accordingly, when attention is focused on the communication between the RFID reader/writer and the RFID tag, an effect of polarization diversity is small, and the maximum polarization plane is determined by the orientation of the RFID tag irrespective of the existence or non-existence of the reflection from the floor. For this reason, the RFID reader/writer transmits and receives the fixed polarization.

In the configuration of the RFID tag system of the third embodiment, the RFID tag conducts communication with the RFID reader/writer while the antenna of the RFID tag is obliquely placed, and the RFID reader/writer combines a maximum ratio using the polarization diversity while separating the vertical polarization and the horizontal polarization.

The patch antenna can be applied to the antenna of the RFID tag in order to transmit the circularly-polarized radio wave.

Figure 6:
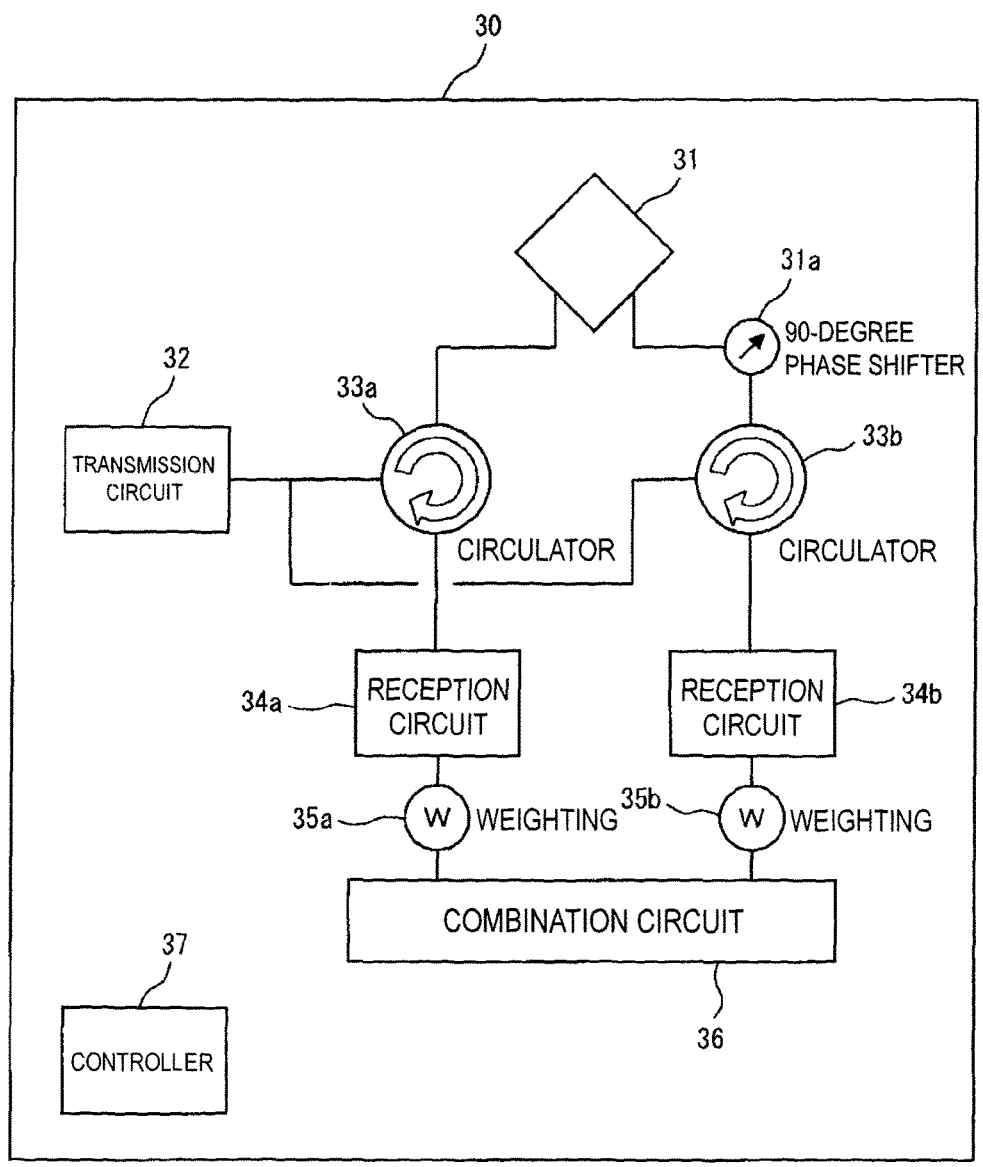
FIG. 6 is a view illustrating a configuration of an RFID reader/writer according to a third embodiment.

FIG. 6 is a block diagram illustrating a circuit configuration of the whole RFID reader/writer in the RFID tag system of the third embodiment. An RFID reader/writer 30 of the third embodiment includes an antenna 31, a transmission circuit 32 that transmits desired data through the antenna 31, a receiving circuit 34*a* that receives the horizontal polarization component, a receiving circuit 34*b* that receives the vertical polarization component, in which the phase of the received signal is changed by 90 degrees, using a 90-degree phase shifter 31*a*, a combination circuit 36 that is connected to the receiving circuits 34*a* and 34*b* to combine signals of the receiving circuits 34*a* and 34*b*, circulators 33*a* and 33*b* that switch between the receiving circuits 34*a* and 34*b* and the transmission circuit 32, and a controller 37 that controls all the circuits.

The receiving circuits 34*a* and 34*b* receive the horizontal and vertical polarization components, respectively, and the combination circuit 36 logically combines the horizontal and vertical polarization components. The controller 37 reconfigures the data using the combination circuit 36 such that the data always becomes maximum S/N.

Figure 7:
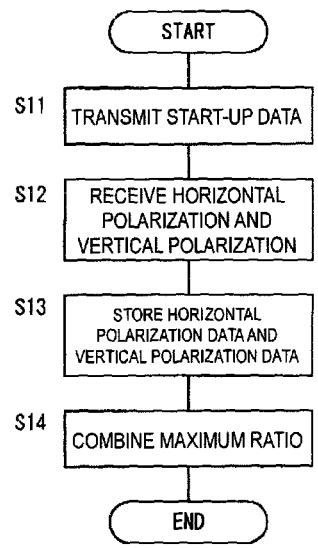
FIG. 7 is a flowchart illustrating an operation of a controller of the RFID reader/writer of the third embodiment.

FIG. 7 is a flowchart illustrating the operation of a controller 37 of the RFID reader/writer 30 of the third embodiment. The transmission circuit 32 transmits start-up data through the antenna 31 in order to start up the RFID tag (not illustrated) (S11). The antenna 31 receives the signal from the RFID tag. At this point, the receiving circuit 34*a* receives the horizontal polarization component and the receiving circuit 34*b* receives the vertical polarization component (S12). The controller 37 separately stores the received data in a memory (not illustrated) (S13). The combination circuit 36 combines the maximum ratio based on the stored data (S14). Specifically, the combination circuit 36 combines the horizontal polarization component and the vertical polarization component such that an S/N ratio of the received signal is enhanced compared with the case that the horizontal polarization component and the vertical polarization component are separately received. Accordingly, the combination circuit acts as the combination part and the optimum combination part. The optimum combination part may be configured to select the received signal having the higher S/N ratio in the received signals of the horizontal polarization component and vertical polarization component. The horizontal polarization and the vertical polarization are described in the third embodiment. Alternatively, the same effect is obtained even if the obliquely-right-45-degree polarization component and the obliquely-left-45-degree polarization component are received.

A verification of the effect of the third embodiment will be described below. In order to verify the effect of the third embodiment, the horizontal and vertical antennas are manually switched instead of the circuit in FIG. 6 to check a difference of the null point.

Figure 8:
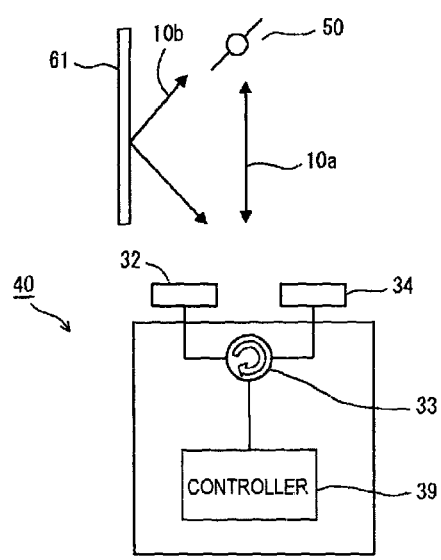
FIG. 8 is a block diagram illustrating a device that verifies an effect of the third embodiment.

FIG. 8 is a block diagram illustrating an entire configuration used in the verification. In the verification, the RFID tag 50 and the RFID reader/writer 40 are disposed while facing each other, and the metallic wall surface 61 is provided as the reflecting surface in the side surfaces of the RFID tag 50 and RFID reader/writer 40 as illustrated in FIG. 3. In FIG. 8, the numeral 10a designates the direct wave and the numeral 10b designates the reflected wave. The RFID reader/writer 40 includes a transmission antenna 32, a receiving antenna 34, a circulator 33 that switches between the transmission antenna 32 and the receiving antenna 34, and a controller 39 that is connected to the circulator 33.

Figure 9:
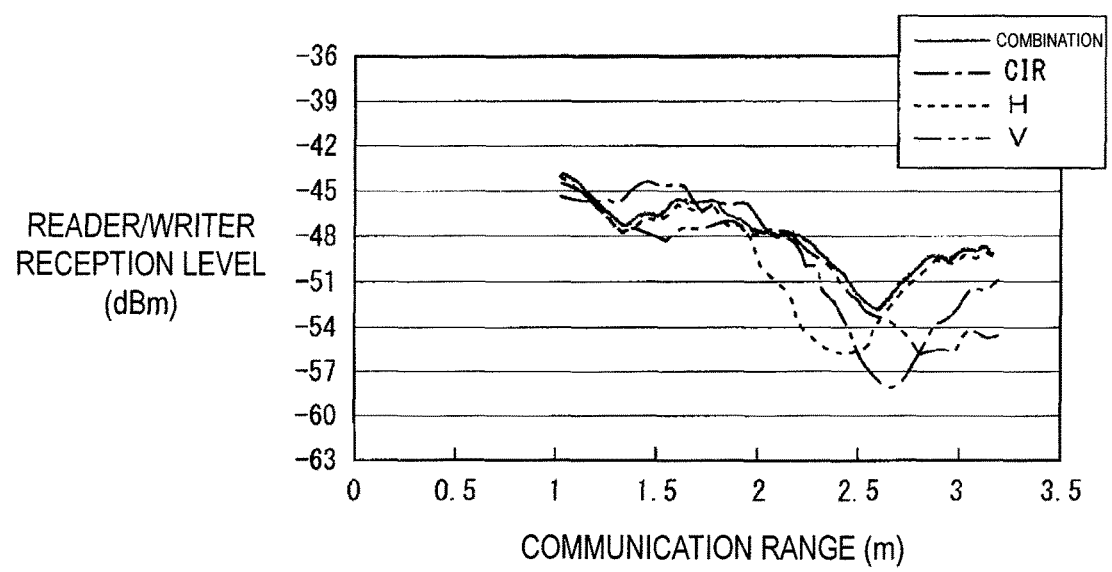
FIG. 9 is a graph illustrating the effect of the third embodiment.

FIG. 9 is a graph illustrating a relationship between a communication range (a horizontal axis) and a receiving level (dB) of the RFID reader/writer 40 in each of horizontal polarization H (a dotted line), vertical polarization V (an alternate long and two short dashes line), and the state in which the horizontal polarization H and the vertical polarization V are combined to increase the receiving level to the maximum, when the receiving antenna 34 is manually switched in the configuration in FIG. 8. FIG. 9 also illustrates circular polarization CIR (an alternate long and short dash line) just for reference.

In each of the horizontal polarization H and the vertical polarization V, the receiving level varies significantly according to the communication range. However, when the horizontal polarization H and the vertical polarization V are combined to connect the pieces of data having the highest receiving levels (a solid line), the high receiving level is obtained irrespective of the communication range. That is, it is checked that the null point can be reduced when the maximum ratio is combined with the combination circuit. In this case, the receiving level higher than that of the circular polarization CIR for reference is obtained.

In the third embodiment, from the viewpoint of a placement area, the one antenna is used as the transmission and receiving antennas. Alternatively, the transmission and receiving antennas may be separated.

In the third embodiment, the two receiving circuits are provided as illustrated in FIG. 6. Alternatively, the one receiving circuit is provided, a switching circuit is provided to process the horizontal polarization and the vertical polarization in a time-sharing manner, and the maximum ratio may be calculated based on two-time communication result.

The method for processing the horizontal polarization and the vertical polarization in the time-sharing manner is well known as an adaptic array antenna control method by, for example, Japanese Patent No. 4581534. Therefore, the specific description is omitted.

The embodiments of the present invention are described above with reference to the drawings. However, the present invention is not limited to the above embodiments. Various modification and changes can be made without departing from the identical or equivalent scope of the present invention with respect to the illustrated embodiments.

The null point is not generated in the RFID tag system of the present invention, so that the RFID tag system can advantageously be used.

What is claimed is:
1. An RFID tag system comprising:
   an RFID tag; and
   an RFID reader/writer,
   the RFID reader/writer comprising:
   a transmitter that transmits a circularly-polarized radio wave to the RFID tag;
   a first receiver that receives a horizontal polarization component of a return wave;
   a second receiver that receives a vertical polarization component of the return wave, wherein the first receiver and the second receiver are separately provided, wherein each of the first receiver and the second receiver includes a weighting circuit separately provided;
   a phase shifter that is configured to change a phase of the vertical polarization component received by the second receiver;
   a circulator that switches between the transmitter and the first and second receivers, wherein the circulator is provided on a path between the phase shifter and the second receiver; and
   a received signal combiner that logically combines signals separately received by the first receiver and the second receiver, and
   the received signal combiner comprising an optimum combiner that combines the horizontal polarization component and the vertical polarization component of the return wave such that an S/N ratio of the received signal is enhanced in comparison to an occurrence in which the horizontal polarization component and the vertical polarization component are separately received, wherein the horizontal polarization component and vertical polarization component are weighted in parallel to each other prior to being combined, and wherein
   the optimum combiner is configured to select the received signal having the higher S/N ratio in the received signals of the horizontal polarization component and the vertical polarization component.

2. The RFID tag system according to claim 1, comprising a single antenna, wherein the transmitter and the first and second receivers are connected to the single antenna.

3. An RFID reader/writer that conducts communication with an RFID tag, the RFID reader/writer comprising:
   a transmitter that transmits a circularly-polarized radio wave to the RFID tag;
   a first receiver that receives a horizontal polarization component of a return wave;
   a second receiver that receives a vertical polarization component of the return wave, wherein the first receiver and the second receiver are separately provided, wherein each of the first receiver and the second receiver includes a weighting circuit separately provided;

a phase shifter that is configured to change a phase of the vertical polarization component received by the second receiver, a circulator that switches between the transmitter and the first and second receivers, wherein the circulator is provided on a path between the phase shifter and the second receiver and a received signal combiner that logically combines signals separately received by the first receiver and the second receiver, wherein the received signal combiner includes an optimum combiner that combines the horizontal polarization component and the vertical polarization component of the return wave such that an S/N ratio of the received signal is enhanced in comparison to an occurrence in which the horizontal polarization component and the vertical polarization component are separately received, wherein the horizontal polarization component and vertical polarization component are weighted in parallel to each other prior to being combined, and wherein the optimum combiner is configured to select the received signal having the higher S/N ratio in the received signals of the horizontal polarization component and the vertical polarization component.

* * * * *